United States Patent
Ploix (10) Patent No.: US 9,438,452 B2
(45) Date of Patent: *Sep. 6, 2016

(54) SYSTEM AND METHOD FOR MULTI-CHANNEL CONTROL SYSTEM

(71) Applicant: Infineon Technologies Austria AG, Villach (AT)

(72) Inventor: Olivier Dominique Ploix, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,498

(22) Filed: Jan. 17, 2014

(65) Prior Publication Data

US 2014/0133545 A1 May 15, 2014

Related U.S. Application Data (63) Continuation of application No. 12/060,455, filed on Apr. 1, 2008, now Pat. No. 8,634,941.

(51) Int. Cl.
| | |
|---|---|
| *H04L 25/49* | (2006.01) |
| *G05B 19/042* | (2006.01) |
| *G08C 19/22* | (2006.01) |
| *H05B 33/08* | (2006.01) |

(52) U.S. Cl.
CPC ........ *H04L 25/4902* (2013.01); *G05B 19/0423* (2013.01); *G08C 19/22* (2013.01); *H05B 33/0818* (2013.01); *H05B 33/0857* (2013.01); *G05B 2219/21013* (2013.01); *Y02B 20/346* (2013.01)

(58) Field of Classification Search
USPC ............................................ 375/238; 700/73
See application file for complete search history.

(56) References Cited

U.S. PATENT DOCUMENTS

| | | |
|---|---|---|
| 5,870,621 A | 2/1999 | Walsh et al. |
| 7,061,312 B2 | 6/2006 | Andersen et al. |
| 7,484,049 B1 | 1/2009 | Kinne |
| 7,565,006 B2 | 7/2009 | Stam et al. |
| 7,825,610 B2 | 11/2010 | Zhao et al. |
| 2003/0222603 A1 | 12/2003 | Mogilner et al. |
| 2004/0078132 A1 | 4/2004 | Fey et al. |
| 2005/0116662 A1 | 6/2005 | Sanchez |
| 2006/0235594 A1 | 10/2006 | Knoefler et al. |
| 2009/0079359 A1 | 3/2009 | Shteynberg et al. |

FOREIGN PATENT DOCUMENTS

EP      1355804 B1     7/2008

OTHER PUBLICATIONS

"16-Output Switch with SPI and PWM Control", Freescale Semiconductor, Document No. MC33999, Rev. 4.0, Apr. 2007.

*Primary Examiner* — Carlos Ortiz Rodriguez
(74) *Attorney, Agent, or Firm* — Slater Matsil, LLP (57) ABSTRACT

A system having has a pulse width modulation controller to successively activate each of a plurality of channels each in its own individual channel time slot is described. The system also has a sampling multiplexer configured to successively sample a signal derived from each of the plurality of channels during each individual channel time slot. Each individual time slot has an individual sampling sequence.

41 Claims, 4 Drawing Sheets

SYSTEM AND METHOD FOR MULTI-CHANNEL CONTROL SYSTEM

This is a continuation application of U.S. Non-Provisional application Ser. No. 12/060,455, filed on Apr. 1, 2008, entitled System and Method for Multi-Channel Control System, which has issued as U.S. Pat. No. 8,634,941, which application is hereby incorporated herein by reference.

TECHNICAL FIELD

This invention relates generally to electronic control systems and more particularly to a system and method for a multi-channel control system.

BACKGROUND

The automotive industry has made much progress in the development of placing peripheral devices in automobiles under electronic control. In the past, electric and electronic devices such as interior and exterior lighting, heating, air conditioning, door locks, ignition systems, braking systems, multimedia systems and other devices, were either controlled manually or by electromechanical control systems such as relays and switches. Electronic control of such peripheral devices, however, allows for more flexibility in features and lower overall system and implementation cost.

Computerized control of interior car lighting, for example, can be used to create situation specific lighting profiles. Situation dependent light intensity profiles can be programmed to allow for interior lights to illuminate immediately when a the car is unlocked in the evening, stay on when passengers exit the car, then slowly dim once the car door has been shut. Such flexibility can be obtained by interfacing microcontrollers and/or microprocessors directly to lighting devices throughout the car. Such microprocessors and microcontrollers can issue pulse width modulated signals to control the illumination level of each lighting device, as well as perform diagnostic measurements of the lights themselves. The microprocessor or microcontroller can even use these diagnostic measurements to determine whether an illumination device has been burnt out or whether the illumination device is illuminated at a proper illumination level.

These microprocessor and microcontroller-based voltage regulation techniques can be used effectively within an automotive system to decrease the total power required to run a car's electrical system. This power savings can help optimize fuel consumption in a vehicle, as well reduce $CO_2$ and other emissions.

As more and more devices are being placed under microprocessor or microcontroller control, however, the microprocessor interface has become more complex and loaded as each successive generation of automobiles is brought to market. For example, some state of the art automotive systems may require 80 or more controllable modules. In the field of automotive control systems, what is needed are systems and methods for dealing with the higher microprocessor interface traffic and control resource loading.

SUMMARY OF THE INVENTION

In one embodiment, a system for a multichannel control system is disclosed. The system has a pulse width modulation controller to successively activate each of a plurality of channels, each in its own individual channel time slot, and a sampling multiplexer configured to successively sample a signal derived from each of the plurality of channels during each individual channel time slot. Each individual channel time slot has an individual sampling sequence.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely a system and method for controlling lighting in an automotive system. This invention may also be applied to other control systems that control multiple components using pulse modulation and require the measurement of feedback from the multiple components being controlled.

Figure 1:
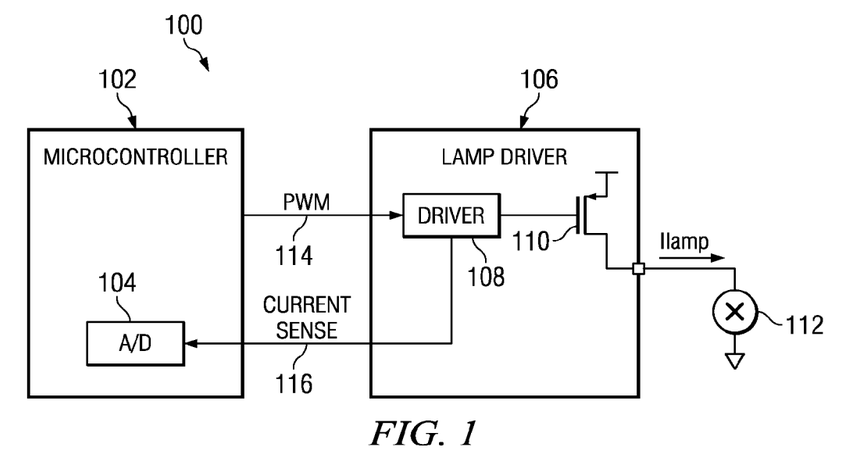
FIG. 1 illustrates a block diagram of a conventional automotive lighting system.

A conventional system for controlling an automotive light is shown in FIG. 1. The system contains microcontroller 102, lamp driver 106, and lamp 112. Microcontroller 102 creates pulse width modulated (PWM) signal 114 that is routed to lamp driver 106. PWM signal 114 typically has a variable pulse length which determines the illumination level of lamp 112. The higher the pulse width of PWM signal 114, the brighter lamp 112 will be illuminated.

Lamp driver 106 typically has a transistor 110 which is used to drive lamp 112. The gate of transistor 110, typically a power FET device, is driven by driver 108. Driver 108 includes circuitry that interfaces PWM signal 114 to the gate of transistor 110. Such circuitry may include gate control circuits, ESD protection, voltage clamps, level shifting circuits and an output current sense circuit. Lamp 112 may be a light emitting diode (LED), halogen lamp, or an incandescent light bulb, as examples. Current sense signal 116, which is derived from current $I_{lamp}$ flowing into lamp 112, is coupled back to microcontroller 102 and digitized using A/D converter 104.

It can be seen that if multiple instances of lamp driver 106 and lamp 112 are used, microcontroller 102 will need to output multiple PWM control signals and digitize multiple current sense signals. Such a configuration poses efficiency problems with respect to wiring, and programming difficulties with respect to scheduling measurement and control tasks.

Figure 2A:
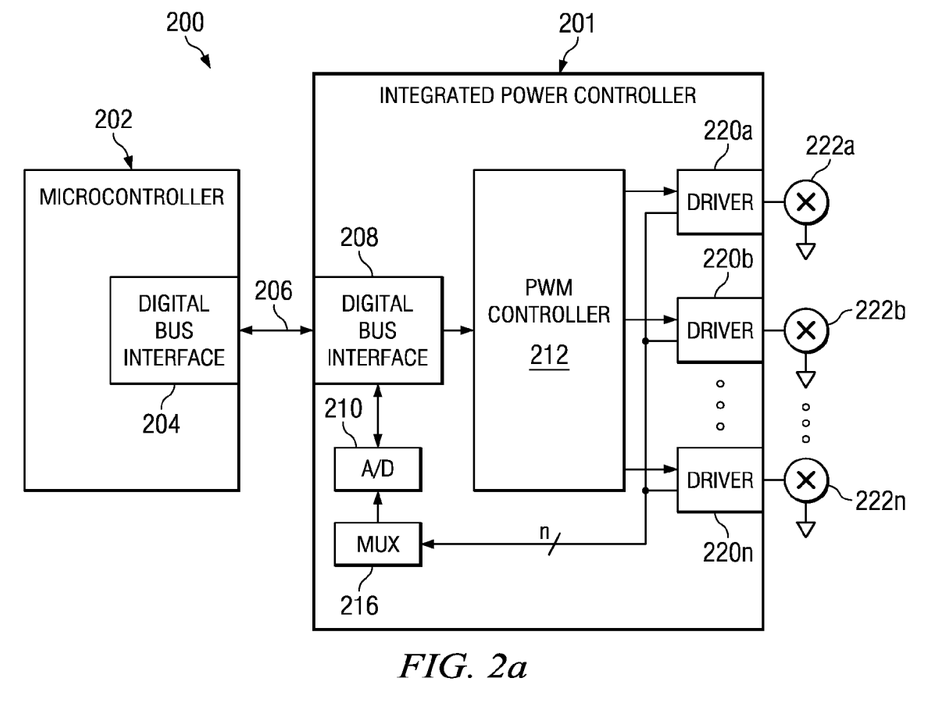
FIGS. 2a-2c illustrate block diagrams of automotive lighting systems according to embodiments of the present invention.

FIG. 2*a* illustrates lighting control system 200 in accordance with a preferred embodiment of the present invention. In a preferred embodiment, PWM generation, A/D conversion, and output generation are performed within integrated power controller 201. Integrated Power Controller 201 is preferably partitioned onto dual integrated circuits. One integrated circuit incorporates high current MOSFET for drivers 220*a*-220*n*, while the other functions reside on a control chip that incorporates CMOS logic. In preferred embodiments of the present invention for systems that incorporate incandescent lights, devices that can withstand at least 40V can be used for output driving devices in Driver blocks 220*a* to 220*n*. In alternative embodiments of the present invention, other processes may be used, both the driver and control functions may be partitioned on a single integrated circuit, or across multiple integrated circuits or other components. In embodiments that only drive light emitting diodes, a high voltage process for drivers 220*a*-220*n* may not be necessary.

In preferred embodiments of the present invention, microcontroller 202 communicates with integrated power controller 201 via a digital bus 206. Digital bus 206 is coupled to digital bus interfaces 204 and 208 as shown in FIG. 2*a*. Digital bus interface 204 and 208 are preferably implemented a serial peripheral interface (SPI) standard. Alternatively, another digital bus standard such as a local interconnect network (LIN) bus, controller area network (CAN) bus, FlexRay or another type of serial or parallel bus, for example, can be used. Digital bus 206 may also be coupled to other peripheral devices or other instances of integrated power controller 201. For example, one instance of integrated power controller 201 may control the illumination of external automotive lights at the front end of a car, while another instance of integrated power control may control the illumination of external automotive lights at the rear of the car. In alternative embodiments of the present invention, a microprocessor or other device capable of interfacing with digital bus 206 may be used in conjunction with or in place of microcontroller 202.

Integrated power controller 201 contains PWM controller 212, A/D converter 210, feedback multiplexer 216, and a plurality of lamp drivers 220*a*-220*n*. The number of drivers 220*a*-220*n* is flexible according to the design and needs of the application. Drivers 220*a*-220*n* are coupled to lamps 222*a*-222*n*. Lamps 222*a*-222*n* can be incandescent, LED, halogen, or any other type of lamp. Lighting types can even be mixed. For example, lamp 220*a* may be a LED while 222*b* is an incandescent light bulb. In alternative embodiments of the present invention, however, over electric or electronic devices may be coupled to drivers 220*a*-220*n* besides lamps, such as motors, heaters, fans, and other devices, for example.

Feedback multiplexer 216 is preferably implemented within a control chip. However, feedback multiplexer 216 can be also be implemented according to any conventional technique known in the art, for example, a switching matrix. Alternatively, feedback multiplexer 216 may reside on the same substrate as the driver devices 220*a*-220*n*. A/D converter 210 is preferably at least a 10 bit A/D converter, however, more or less than 10 bits may be used in alternative embodiments of the present invention. The output of A/D converter 210 is routed to a register or a groups of registers (not shown) in which the most recent channel measurements are stored. As the measurement cycles progresses, A/D measurement data continually overwrites a particular channel's output register until that particular channel is switched off by the PWM controller 212, which enables and disables the overwriting of registers. This way, the most recent A/D measurement can reside in an output register for later reading by digital bus 206.

Figure 2B:
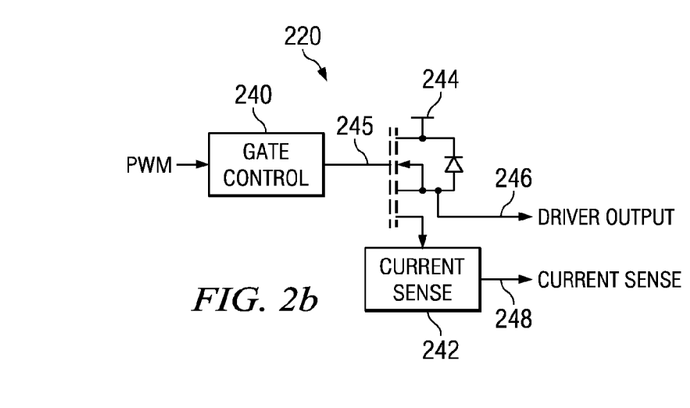

Turning to FIG. 2*b*, output driver circuit 220 contains gate control circuitry 240, current sense circuit 242, and output transistor 244. In preferred embodiments, output transistor 244 is preferably an n-channel FET device, however other types of transistors may be used in alternative embodiments according to the application and the process being used. Gate control circuit 240 contains the necessary interface circuitry to convert the PWM signal in to the proper gate drive signal. Gate control circuit 240, for example, may have level shifters, charge pumps, clamps, temperature sensors, load current limiters, or any other function necessary to effect the efficient and proper operation of output driver 220.

Current sense circuit 242 is used to sense the driver output current and output a representative current 248 derived from the output current of 244. Current sense circuit 242 is preferably implemented using an extra current sensing cell in transistor 244. In preferred embodiments of the present invention, representative current sense 248 is used for diagnostic purposes. In alternative embodiments of the present invention, however, other current sensing techniques may be used, for example, measuring a current using a shunt resistor.

Figure 2C:
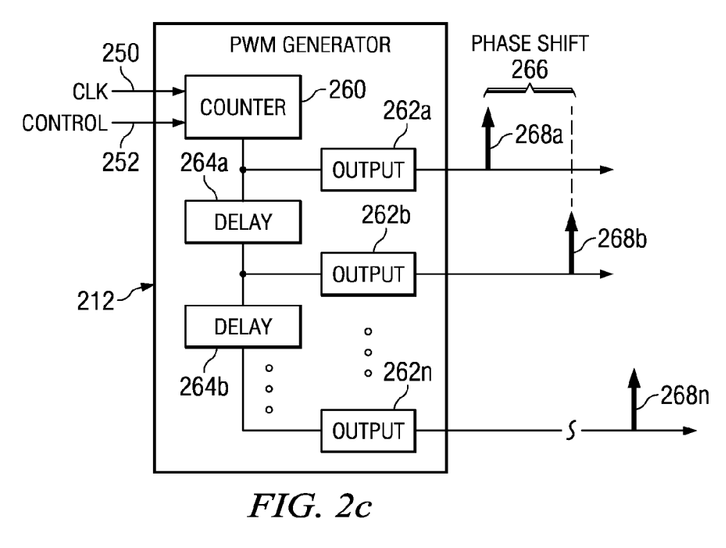

FIG. 2*c* illustrates a block diagram of PWM generator 212. In preferred embodiments of the present invention, PWM generator 212 has a counter 260, which is coupled to delay circuits 264*a* to 264*b* and output circuits 262*a*-262*n*. The counter has a clock input 250 and a control input 252 which typically contains local control signals required to configure the operation of PWM generator 212. The number of output circuits and delay elements depends on the nature of the application. In preferred embodiments, there are preferably between 4 and 8 output channels. For example, if there are eight output channels, there will be eight output elements 262 and seven delay elements 264.

In applications involving automotive lights, the output of each channel is phase shifted with respect to each other using delay elements 264*a*-264*b*. Phase shifting the output channels prevents large simultaneous current transients from occurring when multiple lights, loads or modules are activated at the same time. Staggering the output also prevents and/or mitigates power supply disturbances, such as excessive inductive ringing on the supply.

In preferred embodiments of the present invention, the output frequency of PWM generator 212 is programmable via the SPI interface 208 (FIG. 2*a*) and counter 260 is preferably operated at clock frequency of 102.4 KHz. Preferred output frequencies are 100 Hz, 200 Hz and 400 Hz. In embodiments using incandescent bulbs, a lower frequency, such as 100 Hz, is desirable because of higher power efficiency and lower switching losses. If LED's are being illuminated, on the other hand, a higher frequency, such as 400 Hz is preferable to avoid visible flickering. It can be seen, however, that the input and output frequencies of the PWM generator can assume different values than the values proposed hereinabove. For example, in alternative embodiments of the present invention, a 102.4 KHz signal may not be available or may not be an integer multiple or submultiple of a system clock and a different frequency may be used. Furthermore, in lighting and in non-lighting applications other output frequencies may be suitable.

Besides programming the frequency, the pulse width of the output of the PWM generator is preferably programmable in increments of $\frac{1}{256}$ of the output frequency clock cycle which corresponds to a minimum duty cycle of about 0.39%. For a 400 Hz signal, this corresponds to 9.7 µs. The maximum pulse width, however, can be up to 100% to effect a maximum brightness. In alternative embodiments of the present invention, pulse width granularities other than $\frac{1}{256}$ of the output frequency clock cycle can be used. The counter can be implemented techniques by known in the art.

Delay elements 264a and 264b, which are used to stagger the outputs of the PWM generator to prevent EMC disturbances, are preferably delayed by 32 of the 102.4 KHz clock cycles which corresponds to a delay of 312 µs. In alternative embodiments of the present invention, other staggering delays may be used. Delay elements 264a and 264b are preferably implemented by comparing an output of counter 260 with a delay offset value. When the counter and the delay offset value match, an output transitions to an active state. Alternatively, delay elements can be implemented using any technique known in the art, for example, a shift register or other circuit block. Having a staggering delay consisting of at least as many clock cycles as there are channels is advantageous because it can allow for enough clock cycles to perform an A/D conversion on each channel within each staggering delay period.

Figure 3A:
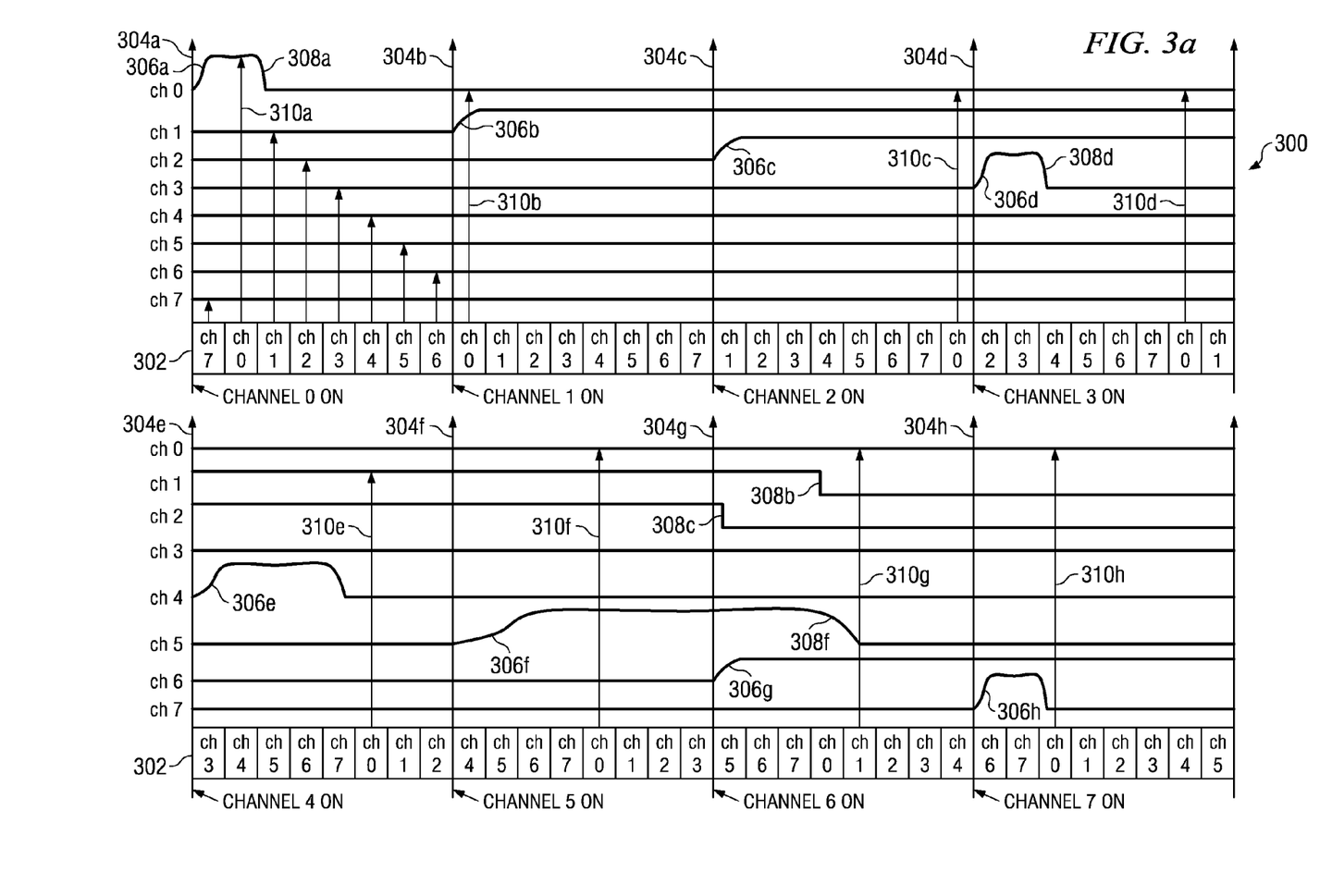
FIGS. 3a-3c illustrates timing diagrams of an automotive lighting systems according to embodiments of the present invention.

Turning to FIG. 3a, timing diagram 300 for an 8 channel measurement system is shown. Timing diagram 300 represents output voltages at the output of drivers 220a to 220n. (FIG. 2a, in this case n=8). Horizontal lines extending from labels ch 0 to ch 7 correspond to a time varying voltages at the output of each channel's output driver. Below the time varying voltage representation is a sample designator 302, which indicates which channel is being measured by the A/D converter. The order of transmission and measurement starts at the left side of the top chart, flows to the right side of the top chart, then continues though to the left side of the bottom chart to the right side of the bottom chart. The chart is divided into 8 sections or intervals 304a-304h, each of which correspond to a particular channel experiencing a positive transition. Arrows extending upward from the labeled boxes of sample designator 302 designate sampling interval. All sampling instances are shown in frame 308a. For simplicity of illustration, only the sampling instances for channel 0 are shown in the remaining diagram, even though all channels are preferably sampled and digitized during operation. It can be seen that the rising edges of all channels are staggered so that each channel is sampled at least one time before another channel changes state. For example, channel 0 experiences rising edge 306a at the beginning of interval 304a, while channel 1 does not experience a rising edge 306b until interval 304b after all channels have been sampled as shown in sample designator 302.

It can be seen further in FIG. 3a, that when the voltage at channel 0 begins to rise at segment 306a during time period 304a, the first channel to be sampled during time period 304a, however, is not channel 0, but channel 7. By allowing the sampling interval for channel 0 to be delayed after channel 0 begins to rise, adequate time can be given to allow for a more accurate current or parameter measurement. In preferred embodiments of the present invention, a direct or indirect current measurement from each channel is being sampled and digitized. In preferred embodiments, the A/D measurement is performed during the second A/D measurement cycle as shown in sample designator 302. In alternative embodiments of the present invention, however, the sampling interval may be chosen to be taken at other positions. For example, if the system is designed for a fast rise time, it may be appropriate perform the sampling or A/D conversion at an earlier sampling interval. In systems with slower rise times, a later sampling interval may be chosen.

Subsequently, when channel 1 is activated at the beginning of interval 304b at portion 306b, channel 0 is sample first, followed by channel 1 in the second position, and followed by the remaining channels in numerical order. When output channel 2 rises, channel 1 is sampled first followed by channel 2 in the second position, and then followed by the remaining channels. Effectively, the sampling schedule shown in sample designator 302 is barrel shifted at each interval 304a-304h so that a channel with a rising edge is sampled during the second sample interval. As a result, the relative sampling times for each channel shifts from interval to intervals, as can be seen by the arrows 310a-310h.

Maintaining a synchronously coupled relationship between PWM output and parameter sampling times as illustrated in FIG. 3a is advantageous for a couple of reasons. First, it can be ensured that good samples can be acquired during active portions of a channel's pulse width modulated waveform. Also, by loading the results of the A/D measurements directly into a register accessible by the bus interface, a simple bus read request can be made rather than a time consuming A/D conversion request followed by a read request. In some embodiments of the present invention, however, it may be desirable to inhibit subsequent A/D conversions during periods of time when the channel output is not asserted. In other embodiments, it may be desirable to not use the first sample of a channel, but use subsequent channel samples in the case of slow switching times in order to give the external load an adequate time to turn on.

Figure 3B:
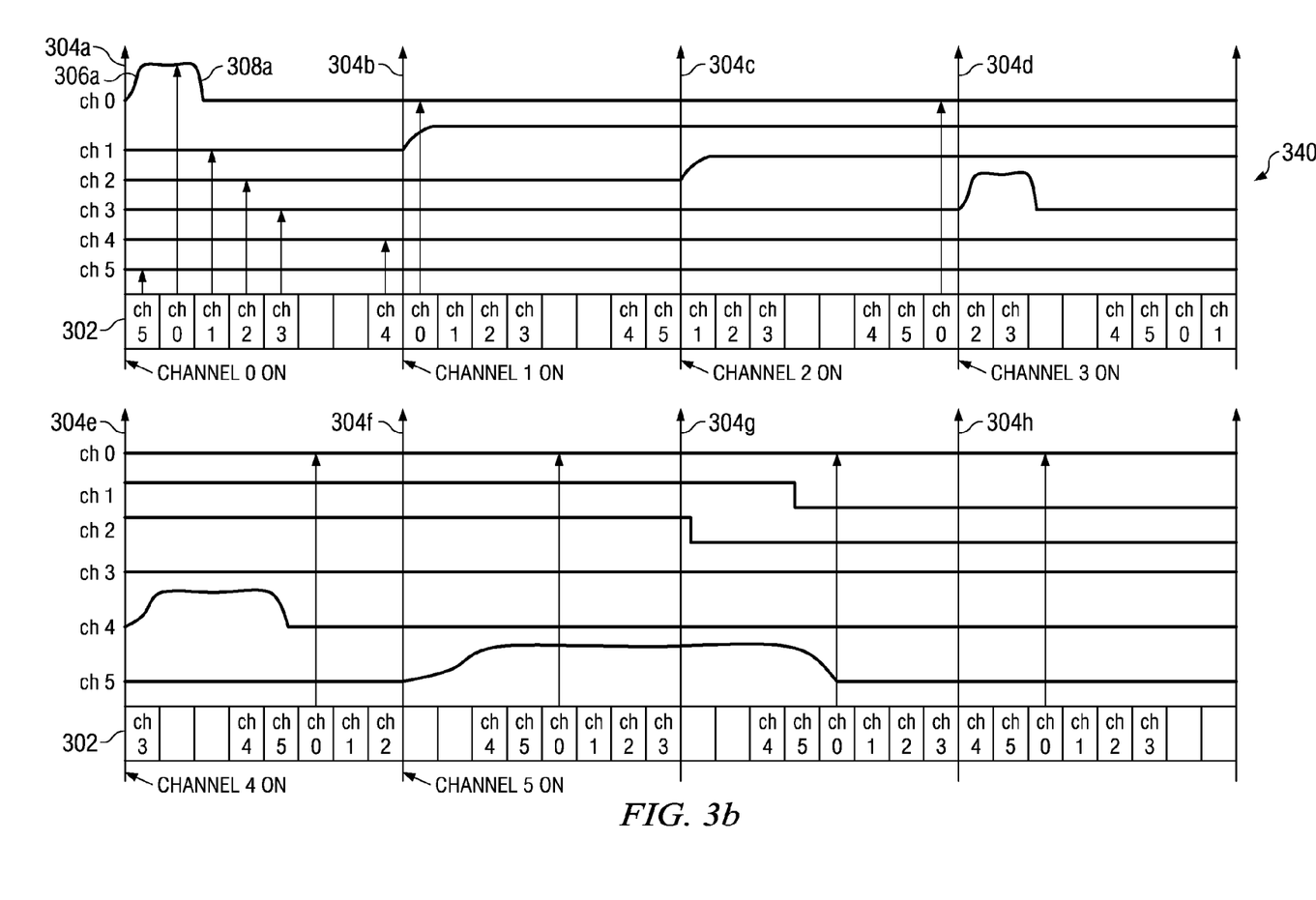

In some embodiments of the present invention, more or less than eight channels can be used, and or less than eight A/D measurements can be made during each channel interval 304. FIG. 3b illustrates a timing diagram 340 for a measurement system in which less than eight channels are used, but the where the general timing scheme of FIG. 3a is used. As shown in the FIG. 3b, only five channels are transmitted and sampled. Each of the five channels ch 0 to ch 5 is given one of the first five channel intervals 304a-304f. During the last two channel intervals 304g and 304h, which are the channel intervals associated with channels 6 and 7 in FIG. 3a, no channels are activated. Similarly, sampling schedule 302 is modified to only sample channels 0 though 5 and not channels 6 through 7. It can be seen that the channel skipping technique according to FIG. 3b can be modified to accommodate more or less than the six channels shown. In alternative embodiments, for example, where only five channels were needed, no channel would be activated during sampling interval 304f. Alternatively, the choice of sampling intervals could be changed for the respective channels. For example, channel 5 could be activated during sampling interval 304h instead of during 304f as indicated in FIG. 3b. Using less channels than the number of channel intervals is advantageous because it allows system flexibility without the necessity of changing timing structure of the PWM controller. More or less channels could be added to an application by enabling or disabling channels and sampling intervals without changing the overall timing. Furthermore, frequency and pulse width calculations (during initialization) can be made independent of the number of channels if the same timing structure is maintained.

Figure 3C:
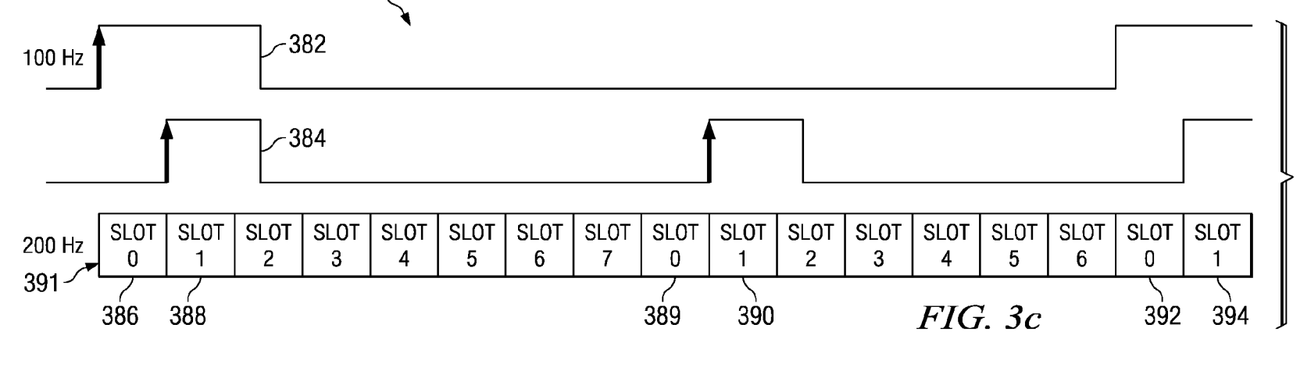

As mentioned hereinabove, different light sources may require different frequencies in order to operate efficiently. Incandescent lights, for example, are more efficient at lower frequencies while LEDs require higher frequencies to avoid flicker. Turing to FIG. 3c, a timing diagram 380 is shown which illustrates how multiple frequencies can be supported in embodiments of the present invention. Waveform 382 is a 100 Hz signal that may, for example, be used to drive an incandescent bulb, while waveform 382 is a 200 Hz signal that may, for example, be used to drive an LED. Slot designators 391 correspond with the channel intervals shown in FIGS. 3a and 3b. 100 Hz waveform 382 is assigned to be activated during slot 0, while 200 Hz waveform is assigned to be activated during slot 1. In the first instance of slot 0 (386), 100 Hz waveform 382 is activated, and in the first stance of slot 1 (388) 200 Hz waveform 384 activated. 200 Hz waveform 384 is again activated during the next occurrence of slot 1 (390), but 100 Hz waveform 382 is not activated during the next occurrence of slot 0 (389) because of its lower frequency. Both waveforms 382 and 384 are again activated during the next occurrence of the slots 0 and 1 (392 and 394) respectively. In alternative embodiments of the present invention, multiple combinations of different frequencies may be supported using the technique illustrated in FIG. 3c.

In other alternative embodiments of the present invention, integrated power controller 201 (FIG. 3a) may be used to drive other modules such as motors or heating elements/resistors. In order to efficiently operate these types of modules, the embodiments described hereinabove may be modified to appropriately address the specification of the module.

It should be further noted that embodiments of the present invention may be used in other systems besides automotive systems, for example in aeronautical systems, homes, buildings, and display lighting systems to name a few. Furthermore, digital interface 208 (FIG. 2a) may even be implemented by interfaces besides the wired interfaces described hereinabove, for example wireless interfaces or analog interfaces.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A multichannel control system comprising:
    a pulse width modulation controller, wherein the pulse width modulation controller is configured to successively activate each of a plurality of channels, each channel of the plurality of channels having a non-overlapping individual channel time slot different from other channels of the plurality of channels, each individual channel time slot being a duration of time in which a corresponding channel is activated; and
    a sampling multiplexer configured to successively sample one after another a signal derived from each of the plurality of channels during each individual channel time slot, wherein all of the derived signals are individually sampled within each individual channel time slot, wherein each individual channel time slot comprises an individual sampling sequence having a sampling order, and wherein the sampling order of each individual channel time slot is different from each of the individual sampling sequences of channel time slots associated with the other channels of the plurality of channels.

2. The multichannel control system according to claim 1, wherein each individual sampling sequence samples each of the plurality of channels a fixed delay from a beginning of each individual channel time slot.

3. The multichannel control system according to claim 1, further comprising an Analog to Digital converter coupled to an output of the sampling multiplexer.

4. The multichannel control system according to claim 1, further comprising a bus interface coupled to the pulse width modulation controller and the sampling multiplexer.

5. The multichannel control system according to claim 4, wherein the bus interface comprises a Serial Peripheral Interface (SPI) Bus.

6. The multichannel control system according to claim 4, wherein the bus interface comprises a Local Interconnect (LIN) Bus, a Controller Area Network (CAN) bus.

7. The multichannel control system according to claim 1, wherein each individual sampling sequence comprises a barrel shifted version of a same sequence in which the pulse width modulation controller successively activates each of the plurality of channels.

8. The multichannel control system according to claim 7, wherein the individual sampling sequence is barrel shifted such that a second element of each individual sampling sequence corresponds to a channel currently being activated by the pulse width modulation controller.

9. The multichannel control system according to claim 1, further comprising a lamp driver coupled to at least one of a plurality of output drivers coupled to the pulse width modulation controller.

10. The multichannel control system of claim 9, wherein the lamp driver comprises an LED driver.

11. The multichannel control system of claim 9, wherein the sampling multiplexer is coupled to a current related to a current supplied by at least one of the plurality of output drivers.

12. A method of operating a multichannel control system, the method comprising:
    activating an output on a first channel, wherein activating comprises transitioning from one state to another state;
    while activating the output on the first channel, sampling a signal derived from a channel other than the first channel and not sampling a signal derived from the first channel;
    after sampling the signal derived from the channel other than the first channel, sampling the signal derived from the first channel;
    activating an output on a second channel after sampling the signal derived from the first channel;
    while activating the output on the second channel, resampling the signal derived from the first channel and not sampling a signal derived from the second channel; and
    after resampling the signal derived from the first channel, sampling the signal derived from the second channel.

13. The method of claim 12, further comprising:
  converting the sampled signal from the first channel from an analog domain to a digital domain representation; and
  writing the digital domain representation to a first channel A/D register.

14. The method of claim 13, further comprising:
  writing a command on an interface bus to activate the first channel before activating the output on the first channel;
  writing a command on the interface bus to read the first channel A/D register; and
  reading the first channel A/D register on the interface bus.

15. The method of claim 14, further comprising reading the first channel A/D register for a last sample before the first channel is deactivated.

16. The method of claim 15, wherein:
  activating the output on the first channel comprises illuminating a light;
  writing a command on the interface bus to activate the first channel comprises writing a frequency and a pulse width;
  the sampled signal from the first channel is a signal derived from a performance parameter of the light; and
  the method further comprising adjusting the frequency and pulse width based on contents of the first channel A/D register.

17. The method of claim 14, wherein writing a command on the interface bus to activate the first channel comprises writing a pulse width.

18. The method of claim 12, wherein activating the output on the first channel comprises illuminating a light.

19. The method of claim 12, further comprising sampling a signal derived from the second channel after sampling the signal derived from the first channel.

20. The method of claim 19, further comprising:
  successively activating outputs on additional channels;
  sampling a signal derived from each additional channel a fixed period of time after each channel is activated;
  converting the signal derived from each additional channel a fixed period of time after each channel is activated to a digital domain; and
  writing the converted signal from each additional channel to a channel designated A/D register, wherein the channel designated A/D register is overwritten;
  deactivating an output on a particular channel; and
  holding a value of a A/D register of the particular channel after deactivating the output of the particular channel.

21. A semiconductor circuit for controlling a plurality of lights, the semiconductor circuit comprising:
  a pulse width modulator, the pulse width modulator configured to
    provide a signal comprising a duty cycle and a frequency to a plurality of output channels, and
    stagger a timing of each signal on the plurality of output channels so that none of the plurality of outputs transition simultaneously;
  feedback paths coupled to ones of the plurality of output channels;
  an analog to digital converter configured to successively sample each of the feedback paths; and
  a bus interface coupled to the pulse width modulator and the analog to digital converter, wherein each output channel is activated in a first repeating sequence of designated output channel time slots; and
  the analog to digital converter successively samples each of the feedback paths in a second repeating sequence,
  wherein the second repeating sequence depends on which one of the designated output time slots is active.

22. The semiconductor circuit of claim 21, wherein the second repeating sequence comprises a shift of the first repeating sequence, wherein a magnitude of the shift depends on which one of the designated output time slots is active.

23. The semiconductor circuit of claim 22, wherein the shift is configured to cause a feedback channel coupled to a present channel to be sampled at a fixed number of second repeating sequence intervals from a beginning of a present channel time period.

24. The semiconductor circuit of claim 22, wherein the pulse width modulator is configured to output a plurality of output frequencies and a plurality of pulse widths.

25. The semiconductor circuit of claim 21, further comprising light sources coupled to ones of the plurality of output channels.

26. The semiconductor circuit of claim 21, wherein the pulse width modulator comprises a counter and a plurality of delay circuits coupled to an output of the counter, wherein the plurality of output channels are coupled to corresponding outputs of the plurality of delay circuits.

27. The semiconductor circuit of claim 26, further comprising a plurality of output circuits coupled between corresponding outputs of the plurality of delay circuits and the plurality of output channels.

28. The semiconductor circuit of claim 26, wherein an output of a first of the plurality of delay circuits is coupled to an input of a second of the plurality of delay circuits.

29. The semiconductor circuit according to claim 21, further comprising:
  a first gate control circuit having an input coupled to a first output channel of the plurality of output channels, the first gate control circuit having an output configured to be coupled to a gate of a first transistor; and
  a first current sense circuit having an input configured to be coupled to a sensing terminal of the first transistor and an output coupled to a first feedback path of the feedback paths corresponding to the first output channel.

30. The semiconductor circuit according to claim 29, further comprising the first transistor, wherein the first transistor comprises a current sensing cell coupled to the sensing terminal.

31. The semiconductor circuit according to claim 29, further comprising:
  a second gate control circuit having an input coupled to a second output channel of the plurality of output channels, the second gate control circuit having an output configured to be coupled to a gate of a second transistor; and
  a second current sense circuit having an input configured to be coupled to a sensing terminal of the second transistor and an output coupled to a second feedback path of the feedback paths corresponding to the second output channel.

32. A system for controlling a pulse width modulated peripheral device, the system comprising:
  a pulse width modulator configured to provide a signal comprising a duty cycle and a frequency to a plurality of output channels, and stagger a timing of each signal on the plurality of output channels so that none of the plurality of output channels turn on simultaneously;
  peripheral devices coupled to ones of the plurality of output channels;

feedback paths coupled to ones of the plurality of output channels;

an analog to digital converter configured to successively sample each of the feedback paths and write a digital domain representation of sampled signal on each of the feedback paths to a corresponding A/D register;

a bus interface coupled to the pulse width modulator and the analog to digital converter; and a controller coupled to the bus interface, the controller configured to issue commands to the pulse width modulator, wherein the bus interface is configured to receive a command to activate a selected channel of the plurality of output channels, receive a command to read an A/D register corresponding to the selected channel, and provide contents of the A/D register corresponding to the selected channel.

33. A multichannel control system comprising:

a controller configured to perform the step of activating an output on a first channel; and a sampling multiplexer configured to sample a signal derived from a channel other than the first channel and to not sample a signal derived from the first channel while the controller activates the output on the first channel, and sample the signal derived from the first channel after sampling the signal derived from the channel other than the first channel, wherein the controller is further configured to perform the step of activating an output on a second channel after the sampling multiplexer samples the signal derived from the first channel; and the sampling multiplexer is further configured to resample the signal derived from the first channel and to not sample a signal derived from the second channel while the controller activates the output on the second channel.

34. The multichannel control system of claim 33, further comprising an analog to digital converter configured to:

convert the sampled signal from the first channel from an analog domain to a digital domain representation; and write the digital domain representation to a first channel A/D register.

35. The multichannel control system of claim 34, wherein:

the controller is further configured to perform the step of successively activating outputs on additional channels;

the sampling multiplexer is further configured to sample a signal derived from each additional channel a fixed period of time after each channel is activated;

the analog to digital converter is further configured to convert the signal derived from each additional channel a fixed period of time after each channel is activated to a digital domain, and write the converted signal from each additional channel to a channel designated A/D register, wherein the channel designated A/D register is overwritten; and the controller is further configured to perform the steps of deactivating an output on a particular channel, and holding a value of a A/D register of the particular channel after deactivating the output of the particular channel.

36. The multichannel control system of claim 34, wherein the controller is further configured to perform the steps of:

writing a command on an interface bus to activate the first channel before activating the output on the first channel;

writing a command on the interface bus to read the first channel A/D register; and reading the first channel A/D register on the interface bus.

37. The multichannel control system of claim 36, wherein the controller is further configured to perform the step of reading the first channel A/D register for a last sample before the first channel is deactivated.

38. The multichannel control system of claim 37, wherein:

the step of activating the output on the first channel comprises illuminating a light;

the step of writing the command on the interface bus to activate the first channel comprises writing a frequency and a pulse width;

the sampled signal from the first channel is a signal derived from a performance parameter of the light; and the controller is further configured to perform the step of adjusting the frequency and pulse width based on contents of the first channel A/D register.

39. The multichannel control system of claim 36, wherein the step of writing the command on the interface bus to activate the first channel comprises writing a pulse width.

40. The multichannel control system of claim 33, wherein the step of activating the output on the first channel comprises illuminating a light.

41. The multichannel control system of claim 33, wherein the controller is further configured to perform the step of sampling a signal derived from the second channel after sampling the signal derived from the first channel.

* * * * *